(12) United States Patent
Kraeling et al.

(10) Patent No.: US 12,382,261 B2
(45) Date of Patent: Aug. 5, 2025

(54) VEHICLE COMMUNICATION SYSTEM

(71) Applicant: Transportation IP Holdings, LLC, Norwalk, CT (US)

(72) Inventors: Mark Bradshaw Kraeling, West Melbourne, FL (US); Tyler Listoe, Oakbank (CA); Guillaume Mantelet, Oakbank (CA); Earle Edie, Oakbank (CA); Andrew McKay, Oakbank (CA)

(73) Assignee: Transportation IP Holdings, LLC, Norwalk, CT (US)

( * ) Notice: Subject to any disclaimer, the term of this patent is extended or adjusted under 35 U.S.C. 154(b) by 636 days.

(21) Appl. No.: 17/668,361

(22) Filed: Feb. 9, 2022

(65) Prior Publication Data
US 2022/0167133 A1 May 26, 2022

Related U.S. Application Data

(63) Continuation-in-part of application No. 16/516,732, filed as application No. PCT/US2018/018689 on Feb. 20, 2018, now Pat. No. 11,284,233.
(Continued)

(51) Int. Cl.
*H04W 84/00* (2009.01)
*H04W 4/48* (2018.01)
(Continued)

(52) U.S. Cl.
CPC ............. *H04W 4/48* (2018.02); *H04W 76/10* (2018.02); *H04W 84/005* (2013.01); *H04W 84/20* (2013.01)

(58) Field of Classification Search
CPC ....... H04W 4/42; H04W 36/14; H04W 36/32; H04W 84/005; H04W 84/10; H04W 36/322; H04W 36/1446; B61L 15/0027
See application file for complete search history.

(56) References Cited

U.S. PATENT DOCUMENTS

2008/0195265 A1 8/2008 Searle et al.
2012/0317161 A1* 12/2012 Bai ..................... G06F 16/435
709/201
(Continued)

FOREIGN PATENT DOCUMENTS

WO WO-2017054880 A1 * 4/2017 ............ H04W 16/32

OTHER PUBLICATIONS

Examination Report mailed Feb. 28, 2023 for corresponding Australian Application No. 2022203337 (3 pages).

*Primary Examiner* — Lan-Huong Truong
(74) *Attorney, Agent, or Firm* — K&L Gates LLP (57) ABSTRACT

A vehicle communication system includes a mobile server unit configured to be operably deployed onboard a first vehicle of a vehicle system. The mobile server unit includes an antenna, a transceiver, and a controller. The controller may control the transceiver to establish a wireless onboard private network with plural mobile client units that are located on other vehicles of the vehicle system, for wireless communications between the vehicles of the vehicle system, while the vehicle system is moving. The mobile server unit may establish the private network in coordination with other mobile server units that are onboard other vehicles in the vehicle system, such that a selected one of the mobile server units may be designated as a master server unit for overall control of the private network, and the other mobile server units are designated as subordinates.

20 Claims, 6 Drawing Sheets

Related U.S. Application Data

(60) Provisional application No. 62/460,862, filed on Feb. 19, 2017.

(51) Int. Cl.
*H04W 76/10* (2018.01)
*H04W 84/20* (2009.01)

(56) References Cited

U.S. PATENT DOCUMENTS

| | | | | |
|---|---|---|---|---|
| 2013/0138534 A1* | 5/2013 | Herwig | ................ | H04W 4/029 |
| | | | | 705/26.61 |
| 2014/0156135 A1 | 6/2014 | Maki et al. | | |
| 2017/0240187 A1* | 8/2017 | Shubs, Jr. | ................ | B61L 23/00 |
| 2019/0356713 A1* | 11/2019 | Demange | ................ | H04W 4/42 |
| 2021/0014837 A1* | 1/2021 | Papasakellariou | .... | H04L 5/0053 |

\* cited by examiner

VEHICLE COMMUNICATION SYSTEM

CROSS-REFERENCE TO RELATED APPLICATIONS

This application is a continuation-in-part of U.S. application Ser. No. 16/516,732 which was filed on 19 Jul. 2019, which claims priority to and is a national stage application under 35 U.S.C. § 371(c) of prior filed PCT application serial number PCT/US18/18689, filed 20 Feb. 2018, which claims priority to U.S. Provisional Application No. 62/460,862, filed 19 Feb. 2017. The entire disclosures of these applications are incorporated herein by reference.

BACKGROUND

Technical Field

Embodiments of the subject matter described herein relate to communication systems for vehicles.

Discussion of Art

A vehicle system may include plural vehicles that are mechanically and/or logically linked (directly or indirectly) to travel together in coordination. Such vehicle systems are known as vehicle 'consists.' For example, a rail vehicle consist (e.g., train) may include one or more locomotives that are capable of self-propulsion and plural railcars, which are incapable of self-propulsion, that are coupled to the locomotive(s) for travel along a track. As another example, a vehicle platoon may include plural on-road vehicles (e.g., semi-trailer tractors) that while not mechanically linked, are communicatively linked for travel together along a road. The lead vehicle may be operated by a human operator, whereas the other vehicles in the platoon are not; the other vehicles are instead controlled (at least in part) by the lead vehicle.

Some vehicle systems are outfitted with wireless devices or wired connections for communications between the vehicles of the vehicle system. Wired connections can be cost prohibitive, due to having to outfit each vehicle with cables and weatherized ports. Also, it may be more time consuming to connect and disconnect such vehicles from one another. Wireless devices may require significant amounts of power to operate, and may not include acceptable communication security features. Also, such devices may be special-purpose in nature, requiring the use of plural different types of wireless devices if different modes of communication are to be used. It may be desirable to provide vehicle communication systems and methods that differ from existing systems and methods.

BRIEF DESCRIPTION

In an embodiment, a system is provided that includes a first mobile server unit disposed on a first vehicle of a vehicle system, and an antenna, a transceiver that can transmit and receive a signal over the antenna; and a controller that has one or more processors to control the transceiver to establish a wireless onboard private network in communication with at least a second mobile client unit that is located on a second vehicle of the vehicle system for wireless communication of the signal between the first vehicle and the second vehicle.

In one embodiment, a method is provided that includes establishing a wireless onboard private network between plural mobile client units disposed on plural vehicles that define a vehicle system, and thereby to facilitate wireless communication of a signal between a first vehicle and a second vehicle of the vehicle system at least while the vehicle system is moving. The method also includes performing at least one action selected from a list of actions comprising: connecting at least one handheld device to a public network via at least one of the plural mobile server units; disconnecting all but one of the first mobile server unit and the second mobile client unit from a public cellular network; converting a first format of the signal received by the first mobile server unit to another, different format prior to transmission across the wireless onboard private network; and converting a first format of the signal received by the first mobile server unit to another, different format prior to transmission to a public network.

In one embodiment, a system is provided that has a first mobile server unit that can be operably deployed onboard a first vehicle. The system also has a controller that can establish an onboard private network in communication with at least a second mobile client unit that is located on a second vehicle for communication of a signal between the first vehicle and the second vehicle while at least on of the first vehicle and the second vehicle are moving. The system can communicate or connect at least one handheld or wearable device to a public cellular network via at least one of the first mobile server unit or the second mobile client unit.

According to another aspect, the mobile server unit may establish the private network in coordination with other mobile server units that are onboard other vehicles in the vehicle system, such that a selected one of the mobile server units is designated as a master server unit for overall control of the private network, and the other mobile server units are designated as subordinates.

According to another aspect, the mobile server unit may establish the private network in coordination with an offboard base station, such as a stationary offboard base station. The offboard base station may establish the private network even where the offboard base station has a public connection.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the invention relate to wireless communication systems for vehicle systems. The system may include a mobile server unit that is operably deployable on a vehicle, e.g., the mobile server unit is sized for being carried onboard the vehicle and has electrical power requirements that can be met by the vehicle's onboard power system during travel. The mobile server unit is an 'eNodeB' or other base station that may include hardware for direct wireless LTE communications with plural mobile client units. Thus, the mobile server unit may include one or more antennas, RF transceivers, and controllers. The mobile server unit may establish a wireless onboard private network with plural mobile client units that are located on other vehicles of the vehicle system. The mobile server unit may establish the wireless onboard private network in coordination with an offboard base station, such as a stationary offboard base station. The offboard base station may establish the private network even where the offboard base station has a public connection. The private network can be used to transmit data signals and/or control or command signals between the vehicles in the vehicle system. Examples include sensor-generated status or operational information, and commands for coordinated braking, distributed power control, and emergency or safety control.

In certain situations, two or more vehicles in a vehicle system or consist may each include a respective mobile server unit. This may be the case if all vehicles in a given transportation system are outfitted with mobile server units, or if certain classes or types of vehicles in a given transportation system are outfitted with mobile server units. For example, in a rail context, certain locomotives may be outfitted with mobile server units. If a train is assembled that may include plural server-equipped locomotives, the train would thereby include plural mobile server units. In an embodiment, each mobile server may establish the wireless onboard private network in coordination with other mobile server units that are onboard the vehicle system and operational. As explained in more detail below, this may involve selecting a designated master mobile server unit, which is responsible for overall network operation, whereas the other mobile server units operate as clients, and/or as servers for sub-network portions of the overall onboard network. In one embodiment, the private network is a private cellular network. A suitable private cellular network is a private LTE cellular network.

Other embodiments may relate to admission and authorization of mobile client units to the network, changing and selection of network channels, server coordination, vehicle order determination, strategies for LTE communications in dynamic environments, and network/communication timing control.

Figure 1:
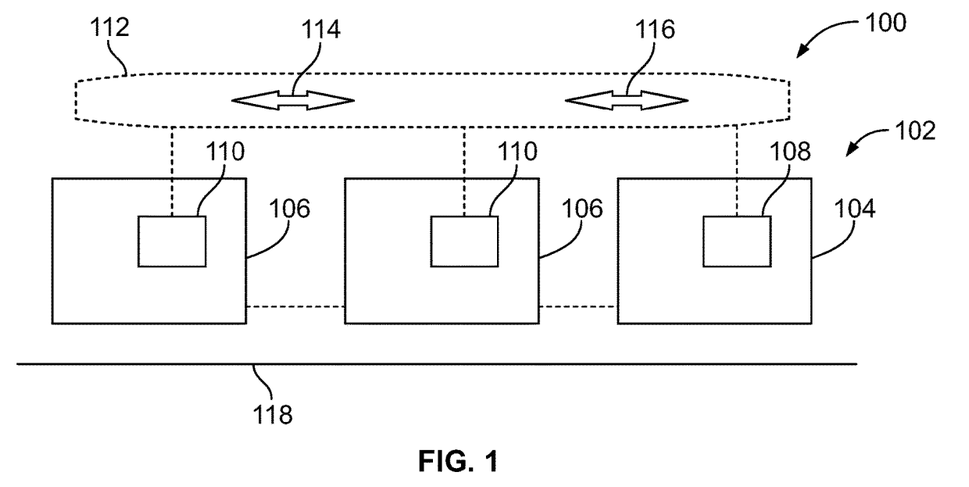
FIG. 1 is a schematic illustration of a vehicle communication system, according to an embodiment.

FIG. 1 shows an embodiment of vehicle communication system 100 for a vehicle system 102. The vehicle system may include a first vehicle 104 and plural (two or more) second vehicles 106, which are mechanically or logically coupled for travel in concert. Additionally, a vehicle system may include plural vehicles that are positioned and/or travelling proximately to one another, but are not mechanically or logically linked. A first mobile server unit 108 is operably deployed onboard the first vehicle 104. Plural mobile client units 110 are operably deployed on the second vehicles 106. For example, there may be one mobile client unit on each vehicle, plural mobile client units on a single vehicle, or some combination thereof. The mobile server unit 108 may establish a wireless onboard private network 112 with the plural mobile client units 110, for wireless communications of data signals 114 and/or control signals 116 between the vehicles of the vehicle system while the vehicle system is moving for travel, e.g., along a route 118.

Private network refers to a discrete communication network or system of interacting networks. In one embodiment, a suitable private network may include an ISM (industrial-scientific-medical) band of the radio-frequency spectrum that allows unlicensed use of LTE technology (e.g., LTE, 4G LTE, LTE Advanced, 5G LTE, etc.) for private, cellular network-like, wireless/RF communications. 'LTE' refers to the 'Long-Term Evolution' standard for high-speed wireless communications (e.g., for mobile phones and data terminals), based on GSM and UMTS technologies, and as developed/specified by the $3^{rd}$ Generation Partnership Project/3GPP. An 'onboard' network, as used herein, is one established by a mobile server unit (e.g., eNodeB, LTE base station, or the like) that is onboard a vehicle of a vehicle system, at least for communications between vehicles of the vehicle system. This does not preclude the possibility of modes of operation where there are communications between the onboard network and offboard networks. An 'offboard' network is one that is established by equipment (e.g., an eNodeB or other base station) that is not on a given vehicle system, e.g., it may be on a different vehicle system, or fixed in place to the ground or otherwise not located on a vehicle. A 'public' network is a cellular communication network, that may be operated by a mobile service provider, which is accessible to a member of the general public with suitably-configured mobile phones or other user equipment. Another suitable private network may be a mesh network. A mesh network may have a local network topology in which the infrastructure nodes (i.e. bridges, switches, and other infrastructure devices) connect directly, dynamically and non-hierarchically to as many other nodes as possible and cooperate with one another to efficiently route data from/to clients. This lack of dependency on one node may allow for every node to participate in the relay of information. Suitable mesh networks may dynamically self-organize and self-configure. The ability to self-configure enables dynamic distribution of workloads, particularly in the event a few nodes should fail. This in turn contributes to fault-tolerance and reduced maintenance costs. Other suitable networks may include conventional star/tree local network topologies in which the bridges/switches are directly linked to a select subset of other bridges/switches, and the links between these infrastructure neighbors are hierarchical.

Figure 2:
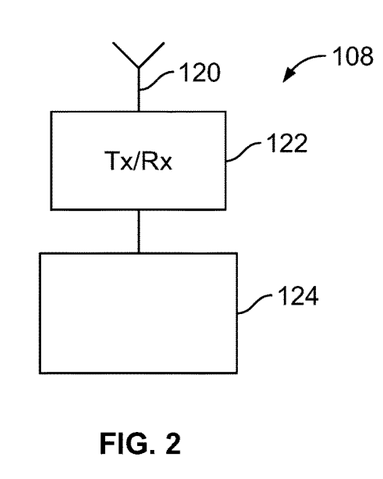
FIG. 2 is a schematic diagram of a mobile server unit, according to an embodiment.

The mobile server unit 108 (referred to as simply a 'mobile server') is an eNodeB or other base station that may include hardware for direct wireless LTE communications with plural mobile client units. For example, the mobile server unit may communicate timing patterns so that mobile client units can communicate with it. Tt may be the case that while operating as a server, the mobile server unit can only communicate with the mobile client units and not with another private network or a public network. FIG. 2 shows an embodiment of the mobile server unit 108 in more detail. The mobile server unit may include one or more antennas 120, one or more RF transceivers 122 coupled to the antenna(s), and one or more controllers 124 coupled to the transceiver(s). The antenna is a transducer that may transmit and receive RF waves in all or a part of the LTE frequency bandwidth. The transceiver may power the antenna for transmitting signals, and to receive and convert signals arriving at the antenna. (The term 'transceiver' includes transmitter-receivers, i.e., separate receivers and transmitters.) The controller may include one or more microprocessors and other circuitry, and controls the transceiver for sending and receiving information wirelessly, for network control purposes and otherwise. The controller may interface with other electronic devices located onboard the first vehicle and/or the vehicle system that use and/or generate information to be communicated. Other electronic devices may include a handheld device such as a mobile phone, laptop computer, tablet, or the like. Unlike mobile client units, the mobile server unit coordinates LTE network communications with plural mobile client units, and carries out various network control functions such as radio resource management, resource block control, connection mobility control, radio admission control, dynamic resource allocation and scheduling, and so on.

Figure 3:
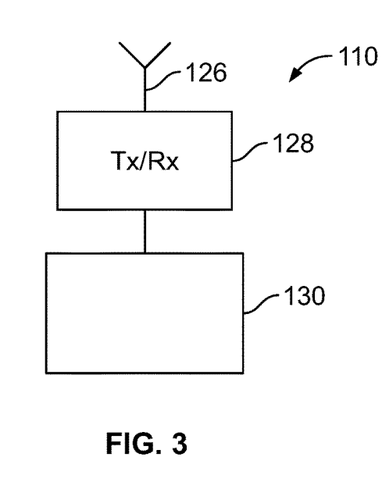
FIG. 3 is a schematic diagram of a mobile client unit, according to an embodiment.

In the illustrated embodiment, each mobile client unit 110 (referred to as a 'mobile client') is a wireless LTE device that must communicate with a server (i.e., eNodeB or other base station) for its communications. A vehicle outfitted with a wireless LTE device that must communicate with a server for LTE network communications may be referred to as a mobile client. With reference to FIG. 3, the mobile client unit 110 may include one or more antennas 126, one or more transceivers 128, and one or more controllers 130. The antenna is a transducer that may transmit and receive RF waves in all or a part of the LTE frequency bandwidth. The transceiver may power the antenna for transmitting signals, and to receive and convert signals arriving at the antenna. The controller may include one or more microprocessors and other circuitry and controls the transceiver for wireless communications with a mobile server unit. The controller may interface with other electronic devices located onboard the vehicle on which the mobile client unit is deployed, which use and/or generate information to be communicated. Other electronic devices may include a handheld device such as a mobile phone, laptop computer, tablet, or the like. The controller may interface with other electronic circuits that are part of the mobile client unit. For example, the mobile client unit may include a processor that controls a user interface portion of the mobile client unit, whereas the controller 130 is specific for controlling wireless communication aspects of the device. Alternatively, the controller may control both wireless communications and other functions. In one embodiment, the controller may enhance signal strength of a received signal before transmitting the signal via the wireless onboard private network. For example, in response to receiving a signal from a mobile client unit, the controller may increase the gain of the signal before transmitting the signal (with the increased gain) to one or more other mobile client units or other devices. Alternatively, in response to receiving the signal form the mobile client unit, the controller may create a new signal with greater strength than the received signal, with the new signal including information from the received signal. The controller can extract information from the first signal and place this information into a different, second signal that is in another format. The controller may convert a first cellular format of a signal received by the first mobile server unit to another, different format prior to transmission to the wireless onboard private network. For example, the controller may receive a first signal as a signal in a Global System for Mobile Communication (GSM) format, in a General Packet Radio Service (GPRS) format, in a Code Division Multiple Access (CDMA) format, in Mobitex format, in an Enhanced Data for Global Evolution (EDGE) format, in a 5G format, or the like. In another example, the controller may receive a signal in Bluetooth format, and may convert that to GSM format. For example, if the first signal is received in an EDGE format, the controller can create a new signal having some or all of the same information in the new signal, but with the new signal in the 5G format or GPRS format.

Figure 4:
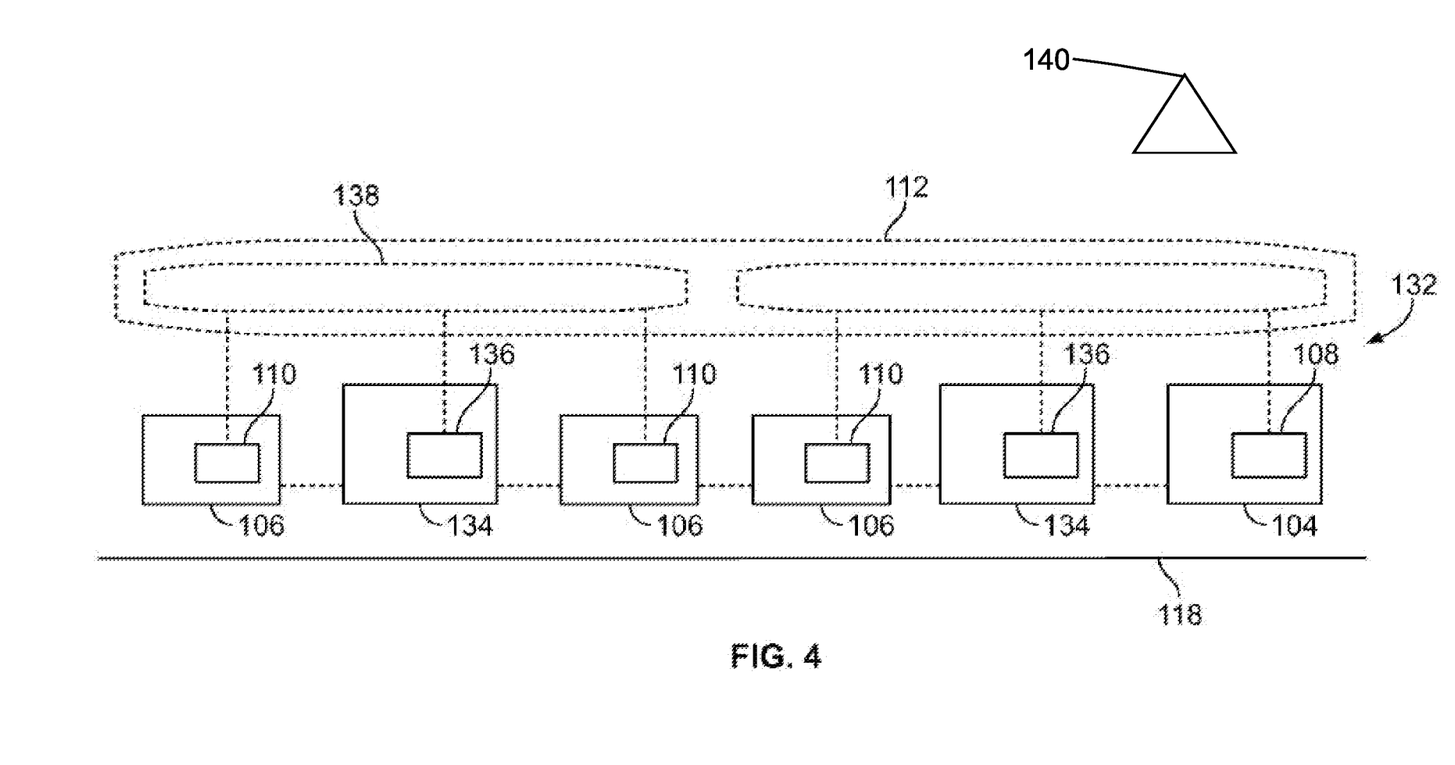
FIG. 4 is a schematic illustration of another embodiment of a vehicle communication system.

With reference to FIG. 4, a vehicle system 132, in addition to including the first vehicle 104 (outfitted with mobile server unit 108) and the plural second vehicles 106 (outfitted with the mobile client units 110), may include other/third vehicles 134 onboard each of which is a respective second mobile server unit 136. For example, as mentioned above, locomotives in a rail transportation system may be outfitted with mobile server units, and there may be times when multiple such locomotives are included in a train. Thus, in an embodiment, the first mobile server unit 104 may establish the onboard private network 112 in coordination with other mobile server units 136 onboard other vehicles in the vehicle system. To put it another way, each mobile server unit 108, 136 that is part of the vehicle communication system 100 may be configured to coordinate with other mobile server units that are part of the same vehicle system, for establishment of the onboard private network 112. Of course, if a given vehicle system includes only one mobile server unit, such as illustrated in FIG. 1, then there is no need for such intra-vehicle system coordination in that instance, keeping in mind that because vehicles may be assembled into different vehicle systems over time (e.g., for different trips or missions), the mobile server units will typically be provided with coordination functionality in case it is ever needed. The vehicle system 132 may further include a signal booster 140, such as a transceiver, repeater, beacon, or the like, that can receive the signal sent from a device onboard the vehicle system (e.g., a mobile server unit) and then repeat or re-send the signal (and optionally can increase the gain or otherwise boost the signal) for receipt by another device or another signal booster. The signal booster may be a stationary wayside device, as shown in FIG. 4, or may be a mobile device disposed onboard the vehicle system or another vehicle.

Figure 5:
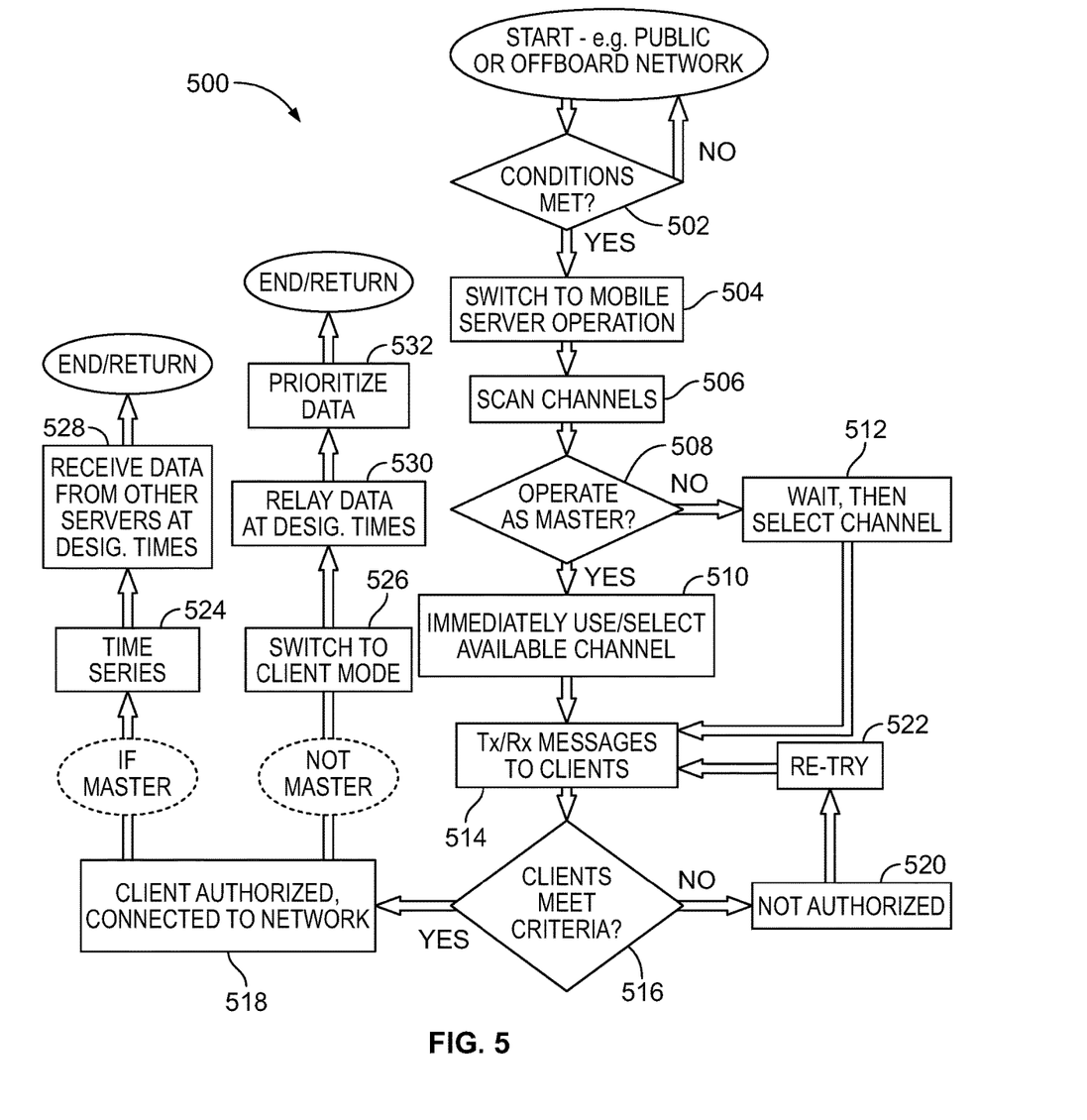
FIG. 5 is a flow diagram illustrating various aspects of mobile server operation.

FIG. 5 illustrates various operational aspects (methods of operation) 500 of the mobile server units 108, 136. In one embodiment, only some of the indicated aspects may be used, or additional aspects may be used, or the indicated aspects may be carried out in a different order or arrangement. The mobile server unit (deployed on a vehicle in a vehicle system) may determine if and when it switches to operate as a server. For example, the communication system may be set up so that under certain circumstances, the mobile server unit is connected to an offboard private network or to a public LTE network, e.g., the mobile server unit is in an operational mode where it operates as a mobile client. Such circumstances may include, for example, the vehicle on which the mobile server unit is deployed being parked or in a yard, e.g., in the case of a rail vehicle, in a rail yard or switching yard, and/or the vehicle not being connected to other vehicles as part of a vehicle system or consist. A rail yard, for example, may have its own private network that is used to communicate with vehicles in the yard. Thus, the mobile server unit may be configured, as at step 502, to determine if one or more designated conditions or criteria have been met for the mobile server unit to switch (e.g., from operating as a client) to operating as a server. The criteria may relate to the vehicle system being located far enough away from a rail yard or other location to reduce the likelihood of interference from other networks, and/or the vehicle (on which the mobile server unit is deployed) being part of a vehicle system. Thus, the criteria may include: the first vehicle or the vehicle system transitioning from a stationary state to a moving state; the first vehicle or the vehicle system moving continuously for a designated amount of time; the first vehicle or the vehicle system moving a designated distance; the first vehicle or the vehicle system leaving a first designated geographic region (i.e., geo-fencing); the first vehicle or the vehicle system entering a second designated region; the vehicle system being in a distributed power mode of operation; the first vehicle or the vehicle system traveling above a designated speed (e.g., the designated speed is a speed limit within an area where the server unit is not to operate as a server, and outside the area there is a higher speed limit); the first vehicle being connected to other vehicles to form the vehicle system; and/or the like.

If the conditions or criteria are met, at step 504 the mobile server unit switches to operating as an LTE server. Since the private network uses ISM channels that are present, the mobile server units may be configured to change to uncongested private LTE channels. In one embodiment, the controller may switch from a first channel to a second channel in response to the signal strength of the first channel falling below a determined threshold value. The channels may be distinguished by frequency, such that each channel has a distinct frequency range for operation. The channels may be distinguished by the data used, such as physical channels, logical channels, and/or transport channels. The determined threshold value may be a fixed value such that when the signal strength falls below the fixed value, the controller switches channels to a channel with a stronger signal. The determined threshold value may be variable, for example the threshold value may change depending on the signal strength of the alternative channels. Said another way, if the signal strength of the first channel decreases by a first amount but the signal strength of all the alternative channels (e.g., the second channel, third channel, etc.) decreases by a second amount, and the second amount is greater than the first amount, the controller may not switch to the second channel. Also, if there are multiple mobile server units in a vehicle system (e.g., each setting up its own private network for the vehicles around it), coordination is required. Thus, the mobile server unit is configured, at step 506, to scan the available LTE channels to look for other LTE networks. This may be done, for example, for identifying other mobile server units that are active in the vehicle system. At step 508, the mobile server unit determines if it should be the mobile server master for the vehicle system. The mobile server master is the selected or designated mobile server unit in a vehicle system that controls the overall LTE network and that serves as the master to other mobile server units in the vehicle system. The determination may be based on vehicle position or other vehicle criteria, e.g., whichever mobile server unit is in a lead vehicle of the vehicle system (front-most vehicle, or designated control lead) is the mobile server master. Thus, at step 508 the mobile server unit may access a vehicle group manifest that may be stored in memory. The vehicle group manifest is a list of the vehicles that make up the vehicle system. This manifest may be uploaded to the vehicles when the vehicle system is assembled. If the vehicle group manifest indicates that the vehicle in which the mobile server unit is deployed meets the criteria (e.g., lead vehicle), then the mobile server unit knows it should be the mobile server master and proceeds accordingly. In one embodiment, the vehicle group manifest is dynamically determined, as vehicle systems may enter (or leave) the group during an operational period.

If the mobile server unit is designated/selected as the mobile server master, at step 510 it immediately uses/selects an available channel. Other mobile server units in the vehicle system will wait additional time, to allow for the mobile server master to become active (e.g., if the mobile server master is on the lead vehicle, for taking into consideration other mobile server units in front of them), and then evaluate and choose a channel, as at step 512. If the mobile server unit is not designated/selected as the mobile server master, it will wait and then choose a channel like the other non-designated/selected mobile server masters. By waiting for designated criteria to be met (e.g., by waiting a configurable amount of time while moving) before the mobile server units activate as servers, this will allow sufficient time for the vehicle system to move away from congested areas (e.g., the private network that is in a railyard) so that all available channels can be seen.

The mobile server units may be configured to evaluate the best channels to use based on a ratio of the strongest server RSSI subtracted by the noise floor, with weighting given to number of masters on a particular channel. Also, in the event that a mobile server unit is having issues due to presence of other servers (masters) in the area, an evaluation to move to a different channel can be made. This can be done immediately. In the embodiment illustrated in FIG. 4, a signal booster 140 is positioned outside of the vehicle system, such as at wayside locations. The signal booster may be a transceiver or a repeater device. The signal boosters may enhance the wireless onboard private network. In one embodiment, the signal booster receives or captures a weak signal, amplifies the signal to boost the weak signal, and then rebroadcasts the enhanced signal. The signal can be amplified by increasing the gain of the signal before transmitting the signal (with the increased gain). In one embodiment, the signal booster receives the signal on a first channel and rebroadcasts the signal on a second channel, where the second channel has less noise or interferences. The signal boosters may be positioned based on historical data at locations where signals are known to be lost or too weak to send the signal. The signal boosters may be positioned at fixed distance intervals, such as every 200 miles. The signal boosters may be positioned at variable distance intervals.

Figure 6:
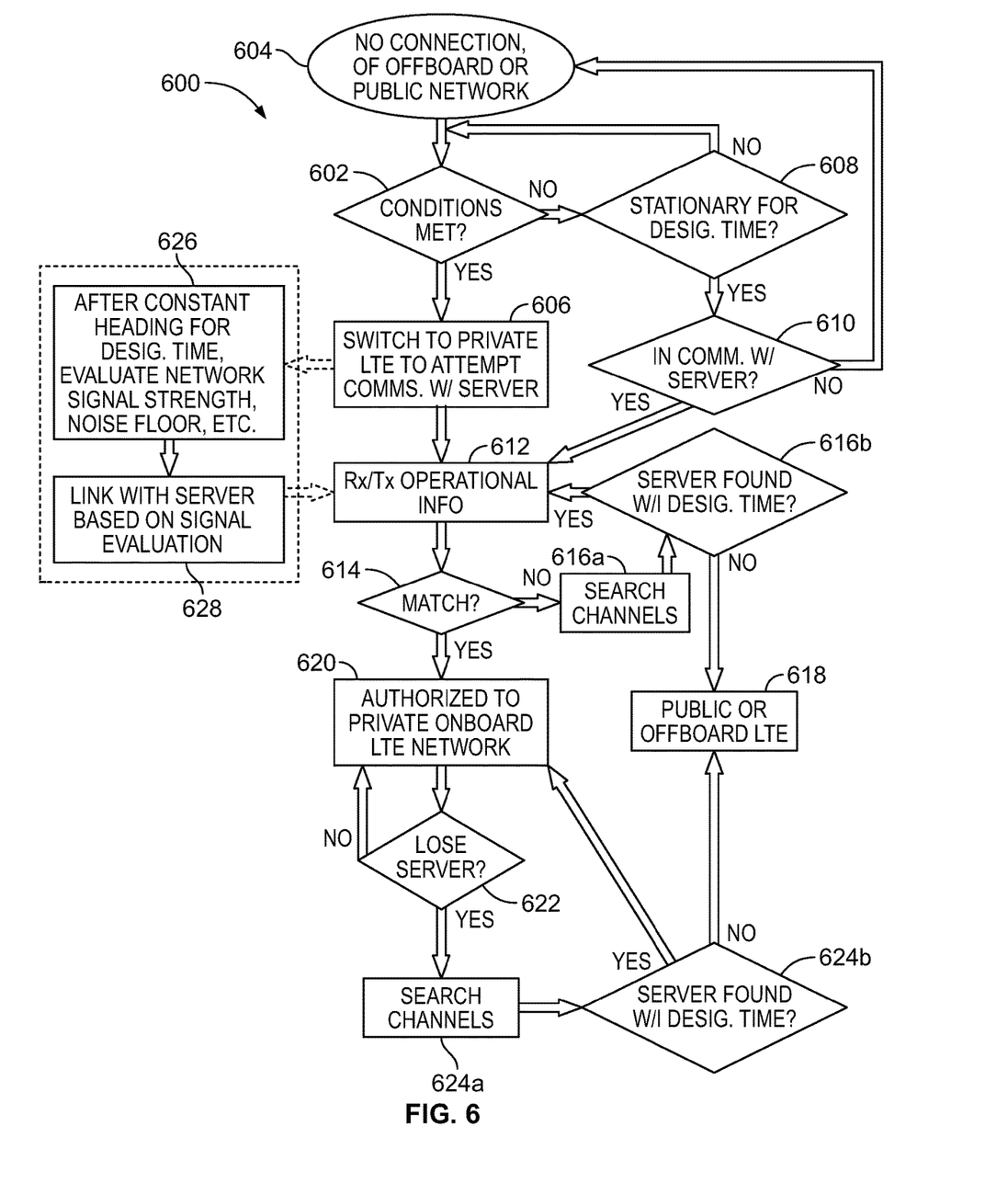
FIG. 6 is a flow diagram illustrating various aspects of mobile client operation.

Turning additionally to FIG. 6, which shows operational aspects (methods of operation) 600 of the mobile client units, the vehicle communication system is additionally configured for authorizing/controlling the mobile client units to link to the onboard private network 112, e.g., the mobile client units are configured to determine or select which mobile server unit to connect to. For a given mobile client unit, the mobile client unit is configured, as at step 602, to determine if one or more designated criteria or conditions are met for the mobile client unit to switch to an onboard private network. The criteria may be the same as those discussed above with respect to step 502. For example, since a mobile client unit that is moving can assume it is part of a vehicle system, the criteria may include a configurable amount of time continuously moving. If the criteria or conditions are met, the mobile client unit switches (e.g., from connection to a public LTE network as at step 604) to an onboard private network channel to attempt communications with a mobile server unit, as at step 606. The mobile client unit may be further configured to determine (e.g., responsive to the conditions not being met at step 602) if the mobile client unit has been stationary for a configurable amount of time, as at step 608, which is indicative that the mobile client unit and/or its vehicle is possibly orphaned. The mobile client unit is configured, if it has been stationary for the amount of time, to revert to individual operation and connection with a public LTE channel (as at step 604), unless active communications with a mobile server unit are taking place, as at step 610. The mobile server units may be configured to communicate with the mobile client unit to indicate the vehicle on which the mobile server unit is deployed (e.g., a locomotive) is distributed power "unlinked," meaning the vehicle is moving to another consist. (In which case, if that is the only mobile server unit with which the mobile client unit is in communication, the mobile client unit may revert back to the public LTE network.)

To authorize mobile client units to the onboard private network, the mobile server unit and the mobile client units may be configured to exchange information to determine if the mobile client units are part of the same vehicle system as the mobile server unit. This enables the mobile client units to be authorized 'on the fly,' without necessarily having been previously configured (such as before the vehicle system was assembled) to access to the onboard private network. (This assumes it is desired for all mobile client units that are onboard a vehicle system to be able communicate over the onboard private network of the vehicle system. If not, the mobile client units and/or mobile server units may be additionally configured for other/additional network connection and authorization functionality, such as all mobile client units within a given transportation company or other entity's fleet being provided with an onboard network access code that is exchanged with mobile server units for authorization.) Thus, the mobile client unit may be configured, as at step 612, to transmit designated operational information of the vehicle in which the mobile client unit is deployed to the mobile server unit with which it is in communication. The designated operational information is received by the mobile server unit, as indicated at step 514 in FIG. 5. The operational information is designated information that is likely to be associated with operation of the vehicle system. For example, it may be a time period of how long the vehicle has been continuously moving since having been stopped (i.e., travel time), speed information (e.g., multiple speeds at different points in time), heading information (e.g., multiple headings at different points in time), brake pipe pressure, location information, and/or the like. The operational information may be adjusted, calibrated, or correlated to take into account differences between where the mobile client unit and the mobile server unit are located in the vehicle system. For example, in the case of a long train, a rear railcar may not start traveling at the same time as the lead locomotive. However, the mobile server unit can be configured to adjust received travel time information based on where the mobile client unit is located in the vehicle system (from a vehicle group manifest or as otherwise determined), or the mobile server unit can be configured to look at the travel time relative to a given threshold (e.g., all vehicles in a vehicle system would have started moving within 'x' seconds of when the vehicle of the mobile server unit started moving), or the mobile server unit can be configured to look at multiple factors, or the mobile server unit and/or the mobile client units can be configured to calculate/determine the operational information only after (relative to when) a designated event or condition has occurred. For example, in the case of travel time, the travel time could be determined relative to when the vehicles in the vehicle system first started traveling at or above a designated speed, which is selected as a speed where it is likely that all vehicles in the vehicle system would be currently moving. (In the case of a train or other rail vehicle consist that commences movement after having been stopped, for example, it is unlikely that one vehicle in the consist would be traveling, say, at 30 kph while another vehicle in the consist is stopped.)

At step 516, the mobile server unit may determine if the operational information received from the mobile client unit meets one or more designated criteria. For example, the mobile server unit may determine if the received operational information (as received, or as correlated/adjusted) matches corresponding operational information of the mobile server unit or the vehicle in which the mobile server unit is deployed. For example, the mobile server unit may compare received travel time to its own travel time, to see if they match (e.g., exactly, or within a designated threshold). If the operational information meets the one or more designated criteria, the mobile client unit, as at step 518, is connected/authorized to the onboard private network of the mobile server unit. If not, as at step 520, the mobile client unit is not connected/authorized to the network, and there may be a re-try period as at step 522. For example, with reference back to FIG. 6, if the operational information meets the one or more designated criteria (e.g., a match) as at step 614, the mobile client unit is connected/authorized to the network, as at step 620. If not, the mobile client unit may be configured, as at step 616*a*, step 616*b*, to search available private LTE channels for finding a server unit or other server unit within a designated time period. If a server unit is found within the designated time period, the mobile client unit may transmit the designated operational information to that mobile server, etc. If not, the mobile server unit may switch to public LTE network access, as at step 618.

The communication system may be set up so that the mobile server units transmit designated operational information to the mobile client units for the mobile client units to assess the given criteria for network access, or for the mobile servers and mobile clients to exchange such information. In one embodiment, security measures or requirements are provided for authorizing mobile client units to the onboard network. Suitable security measures may include network keys, the mobile client units having proper or designated communications security features, lists/databases of authorized devices, vehicle group manifests (e.g., whether the mobile client unit is onboard a vehicle that is on the vehicle group manifest as being part of the vehicle system), security tokens, multi-factor authentication, encryption keys, and so on.

Further regarding channel selection, the mobile client unit may be configured, if it loses communications with its mobile server unit on a particular channel for a configurable amount of time, as at step 622, to conduct a search on available private network channels to find its old server unit on other channels. If the server unit is not found within a configurable (e.g., long) period of time, as at step 624*a*, step 624*b*, the mobile client unit switches to a public LTE network, as at step 618. This could be done if the mobile server unit is malfunctioning or turned off—either way it is unavailable. On the other hand, if the server unit is found, it is reconnected, regardless of time or movement.

As mentioned, if there are multiple mobile server units on a vehicle system, the system is configured for coordination among the multiple server units. More specifically, if a mobile server unit is on vehicle that is remote from the vehicle of the mobile server master (e.g., on a distributed power remote locomotive), it may operate as a server for mobile clients around it, i.e., it may establish its own private network 138 (see FIG. 4) with nearby client units, which is in effect a sub-network of the overall vehicle system network. In the case of multiple such remote mobile server units, there may be plural private networks/sub-networks established on the vehicle system at any given time. The mobile server units thereby communicate with their respective mobile clients and with the mobile server master (e.g., lead locomotive). This may involve using GPS time to determine when the mobile server units (remote and master) should spend time syncing up. Also, this can be done by using the amount of time continuously moving, as well as a database or vehicle group manifest so that the server units know which units are in the vehicle system.

For coordination, in an embodiment, the mobile server units that are part of a consist of other mobile server unit-equipped vehicles (e.g., a locomotive consist), that is, adjacent to or otherwise in close proximity to other mobile server unit-equipped vehicles, will use the lead mobile server unit (e.g., lead locomotive) as the mobile server master. As at step 524 in FIG. 5, the mobile server master will set up a time series, where mobile servers that are not the master (e.g., remote or trailing locomotives in a network) will join the master mobile server at certain times to relay data (TDMA-like access). As at step 526, trailing mobile server units (e.g., mobile server units that are on trailing locomotives, or otherwise not on lead vehicles of a vehicle consist) will have the option of not being a mobile server—as their close proximities to the mobile server master (e.g., lead locomotive) or lead remote does not necessarily help in network health. In this case, they will switch to a mode for operating as mobile clients. At specific time intervals, the mobile server master will coordinate messaging with the mobile clients that are typically mobile servers (the mobile servers will change type for this time interval). This is so information can be transmitted to the mobile server master from other server units (e.g., so that information can be brought forward to the front of the train), as at step 528 and step 530. In other words, for specific/designated time events, the mobile servers switch modes to temporarily operating as mobile clients, in order to relay information to the mobile server master (e.g., to the front of the train). Time intervals for communicating information in this situation (e.g., for bringing information to the front of the train) may involve critical data first for the safe operation of the vehicle system, and time slots will be set up to allow this prioritization of messaging, as at step 532. Messages that are not acknowledged by the mobile server master will have the capability of being repeated, again more so based on their criticality. Also, the system may be configured for frequency coordination during these events, for example, based on the vehicle system maintaining a specific heading for a period of time (e.g., covering the length of the train based on speed) because directional antennas on the mobile server units will be most useful then (in a straight line).

Because the onboard private network is established on a moving vehicle system, the communication system 100, in embodiments, may address dynamic aspects of the communication environment, e.g., obstructions, multipath, and fading. In one aspect, for a train or other linear vehicle system, one or more of the antennas 120, 126, but more typically the antennas 126 on mobile client units, may be directional antennas. This would focus the RF signals from back to front (or vice versa in the case of mobile server units on a train), thereby facilitating a certain level of noise immunity. Further, understanding the heading of the vehicle system allows a mobile client unit to make the best decision when it comes to choosing a mobile server unit to participate with. Thus, as at step 626 in FIG. 6, the mobile client unit may be configured, when searching for a private network and having been at a constant heading for at least a certain/designated amount of time, to evaluate signal strength and noise floor to choose the correct or best mobile server unit, as at step 628. Listening to the current mobile server should provide information on other mobile servers that are part of its network, including the mobile server master. In embodiments, a mobile client unit has a choice of communicating an urgent event (e.g., for the safe operation of the vehicle system) to not only its current mobile server, but change frequencies to send this status/information to another mobile server or more importantly the mobile server master (e.g., at the front of the train). According to another aspect, a mobile client unit may exist in a state where it remains a member of a network, even if it has not seen its mobile server for a period of time. For example, it is expected that a mobile client unit may not see its mobile server continuously (e.g., due to tunnels, heavy foliage, or turns), and should queue status events or other communications until the mobile server returns.

The mobile server units, as mentioned, may include directional antennas. Also, they may each include multiple respective antennas, e.g., one that is directional, and one that is omni-directional. In such a case, the mobile server units would be configured to choose which antenna to use based on whether the mobile server transitions to acting as a mobile client in the event of connection to a public LTE network. Alternatively or in addition, multiple directional antennas may be provided for spatial diversity for onboard communications. Further, the mobile server units may be configured to periodically provide information to the mobile clients about the makeup of the network, including the frequency channels of other mobile servers and the mobile master. This allows a mobile client unit to understand the network topology and make more informed decisions for switching mobile servers.

The communication system 100 may be further configured for antenna performance to be evaluated for longer time periods. Depending on the directional antenna type, for example, average RSSI values can be recorded by mobile clients that are in the network. Depending on the order of the mobile clients, if on the same heading for a period of time (straight line), the signal strength from antenna to mobile client should be very close to the same for a given distance. If the signal levels are appreciably different, an antenna issue can be detected. This would need to be done over a longer period of time due to elevation changes and antenna placement.

For private network operation, it may be necessary or desirable to time synchronize the mobile client units and the mobile server unit(s). Time synchronization benefits are two-fold. First, a centralized analytics system is able to report events efficiently based on the time reported by the different sensors on the whole vehicle system. Second, TDMA access may be guaranteed by properly configuring time slots to the different mobile clients. Also, a TDMA scheme can be extended to the different sensors in the vehicle system (e.g., used for monitoring vehicle operating conditions), for receiving sensor information on tight schedules. Time-sensitive networking (TSN) may specify that networks with no more than seven hops are able to guarantee sufficient accuracy when distributing time. Even in cases involving distributed vehicles, each private network may fail to distribute time accurately to a set of distant mobile clients. Thus, the communication system may distribute for precise timing. For example, sync messages (and possibly follow ups) may be used to synchronize real time clocks. In one embodiment, time domains are partitioned between (sub) mobile servers. Sub mobile servers would be mobile clients augmented with an access to an accurate time source (such as GPS time) to avoid time discrepancies between domains. In another embodiment, a networking distribution time is defined where a mobile server would be a root mobile server distributing and communicating with sub mobile servers.

One aspect of establishing a private network in a multi-vehicle system may involve the actual ordering of the vehicles. As such, with reference to FIG. 7, the communication system may be configured to carry out one or more methods 700 to determine the approximate placement of vehicles throughout a vehicle system. (Such methods are in fact applicable to select wireless networks). For example, in an embodiment, the mobile server master (e.g., lead locomotive or lead vehicle) may, at step 702, determine that a measurable event is taking place, including a change in speed (speed delta over a given time/rate), change in heading after going in one direction for a length of time calculated to be as long as the vehicle system (heading delta over a given time/rate), brake pipe pressure change event (BPP over time/rate), or the like. When this event occurs, the mobile server master transmits a message to the network indicating the occurrence of the event and the time when the event occurred, as at step 704. This message may include the actual real calendar time when the event occurred (for instance, "At 3:59:21 pm a change in direction from 10 degrees to 45 degrees was completed, and I have been at 45 degree heading for 10 seconds"). The mobile server master then listens for mobile clients in the network to have this event occur, as at step 706. This event applies to mobile server units (e.g., locomotives) that are not the mobile server master (e.g., not on the lead locomotive in the consist). The events, as they occur, on a trailing or remote vehicle (equipped with a server unit) will act just like the mobile client unit entries in this situation. This can be done to understand or verify vehicle order, as at step 708. Specifically, if an event occurs at the lead vehicle at a given time, the next vehicle where the event next occurs should be closest to the lead vehicle, the next vehicle where the event next occurs should be next in order, and so on. Also, the "event seen" messages can be used to understand if a mobile client-equipped vehicle (e.g., railcar) is closer to another mobile server-equipped vehicle (e.g., locomotive) as opposed to the network that it is participating in. A trailing or remote mobile-server equipped vehicle can announce this event cycle from the lead for the members of its network, acting as a relay node for the message.

Figure 7:
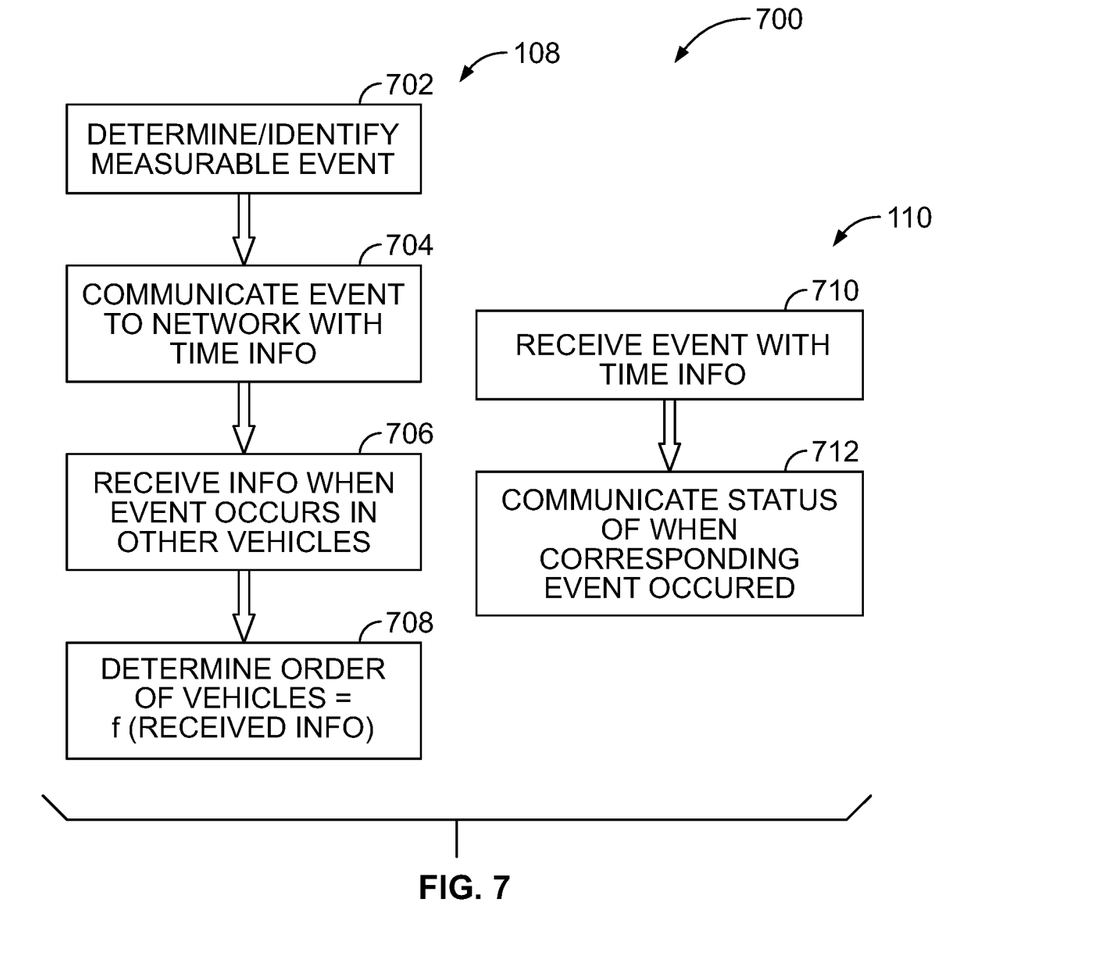
FIG. 7 includes flow diagrams of a method for determining vehicle order in a vehicle system, according to an embodiment.

Further with reference to FIG. 7, the mobile client units may, as at step 710, listen for the ordering start messages to occur. Whether it is change in speed, change in heading, change in brake pipe pressure, or otherwise, when these events occur the mobile client unit will announce its status, as at step 712. The status on a vehicle (on which the mobile client is deployed) will always be announced—decision making for whether it is correct or not will be made at the server level. Announce messages help mobile servers and mobile clients to determine/locate the master clock (likely to be a mobile master server), and help (sub) server nodes act as a slave where they receive the time from the master clock, and become a master clock for the mobile clients connected to it. A mobile client can use the announce message to take the announce time, and based on when the event is seen, have an approximation of how far back in the vehicle system the mobile client is.

Once the mobile client has announced its status, the mobile server can send a message back to the mobile client to verify it is a member of its vehicle system, or possibly let the mobile client know that it is no longer a member of the network (e.g., because it did not respond to announce message for heading change). The mobile client has the option of telling the mobile server that it never received the announce message for ordering, so it has an option of staying in the network.

Alternatively or additionally, determinations of vehicle ordering or positioning in an LTE network-equipped vehicle system may be based on using Observed Time Difference of Arrival (OTDOA) and/or enhanced Cell ID (eCID). An overview of these LTE features is available in Mike Thorpe, M. Kottkamp, A. Rössler, J. Schütz, "LTE Location Based Services Technology Introduction—White paper", Rohde & Schwarz (April 2013), available at http://www.rodhe-schwartz-wireless.com/documents/LTELBSWhitePaper_RohdeSchartz.pdf, which is hereby incorporated by reference herein.

Figure 8:
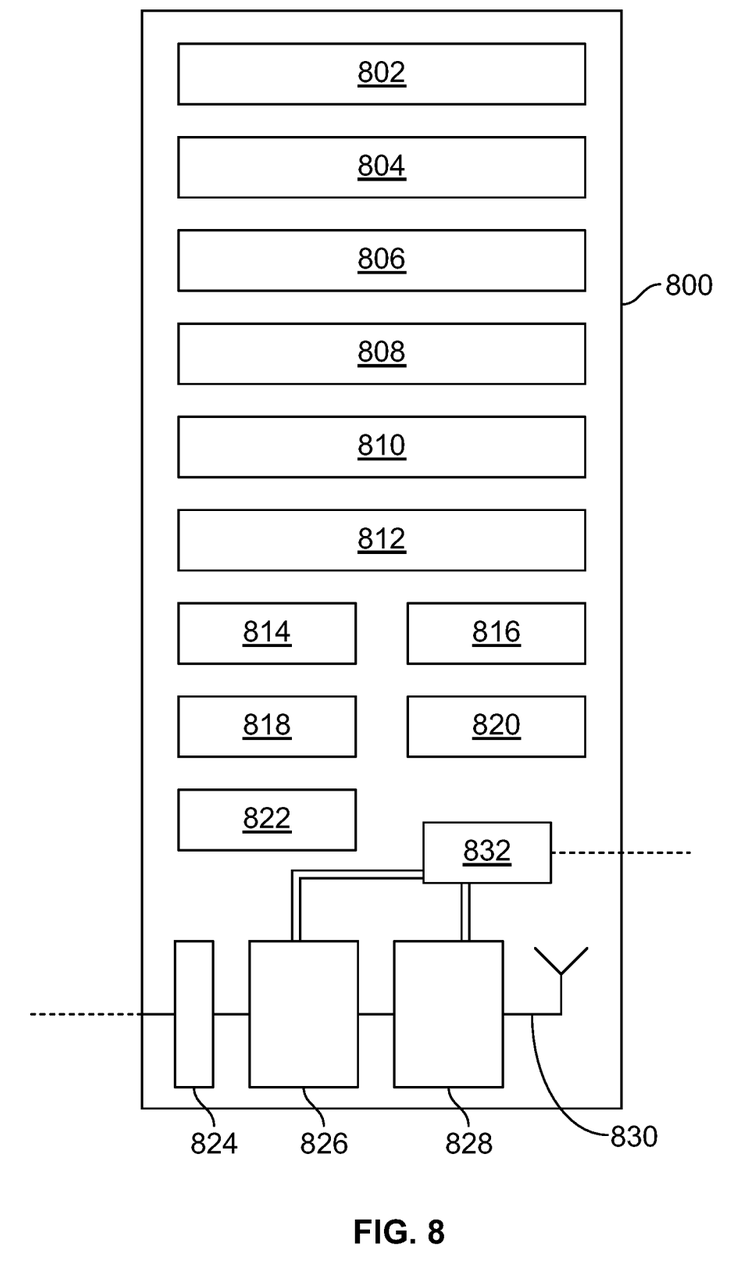
FIG. 8 is a schematic diagram of an embodiment of a mobile server unit.

FIG. 8 shows a functional and schematic diagram of an example of a mobile server unit 800, e.g., as might be applicable for use as the units 108, 136, etc. The mobile server unit may include a chassis, cabinet, or other housing (not shown), which houses one or more controllers (e.g., microprocessors and related circuitry) 826, one or more RF amplifier and transceiver circuits 828, one or more antenna ports 830 for attaching one or more antennas or antenna leads to the RF amplifier and transceiver circuits, a power supply 832 (connected to an onboard power source, such as an electrical bus, not shown), and an input/output (I/O) block 824 connected to the controllers. For example, the I/O block may include various ports and related circuitry to electrically connect the unit to an onboard Ethernet network, an onboard vehicle controller, another onboard control or communications bus, etc. The one or more controllers are configured (by way of programming stored in memory, and/or by way of circuit configuration) to implement various control aspects for carrying out LTE communications as set forth herein. These may include, for example, inter-cell radio resource management 802 (functions related to the radio bearers, such as radio bearer control, radio admission control, radio mobility control, scheduling and dynamic allocation of resources in both uplink and downlink), resource block control 804 (controlling transmission based on resource blocks, each of which consists of a certain sub-carrier bandwidth for a designated time slot/period), connection mobility control 806 (i.e., in-cell radio resource management), radio admission control 808, measurement and measurement reporting configuration for mobility and scheduling 810, and dynamic resource allocation (scheduler) 812. Other functions/functional layers may include radio resource control 814, packet data convergence control 816, radio link control 818, medium access control 820, and a physical layer 822 (which may include the aforementioned I/O block, controllers/amplifiers, etc., and/or antenna and transmission control such as OFDM.)

Additionally, the one or more controllers may connect at least one handheld or wearable device to a public cellular network via one of the first mobile server unit or the second mobile client unit. The controller may act as a mobile switching center and receive the data stream from the handheld device, such as a voice call from a mobile phone. The first and second mobile client unit may serve as a base station or Node B. The controller may direct the data stream to the first mobile server unit or the second mobile server unit, and the first mobile server unit or the second mobile server unit may then connect the data stream to the public cellular network. The controller may connect outgoing calls, deliver SMS messages, arrange handovers from the first or second mobile server unit to the public cellular network, and the like. The controller may disconnect all but one of the first mobile server unit and the second mobile client unit from the public cellular network. This may simplify the operation by having a single point of handoff to the public cellular network. Additionally, the controller may disconnect from weaker or more unstable mobile server units or mobile client units and use the strongest connection as the handoff point to the public cellular network.

The controller may identify various types of data streams in the signals received by the first mobile server unit via the wireless onboard private network. The different types of data streams may be based on information contained in the signals, the source device sending the signal(s), and/or the receiving device that receives the signal(s). The signals may be output from onboard sensors, output from offboard sensors, sending and receiving signals from the sensors, audio calls, internet access and downloads, and the like. The data streams may be sent from onboard to offboard, from offboard to onboard, or from onboard to onboard. With respect to different types of data streams based on the information in the signals, the data streams may include messages such as vehicle operational messages, health information, route information, and user messages. Vehicle operational messages may include information related to the throttle or speed of the vehicle, brake settings, sensor measurements of a propulsion system and the like. Operational message may include information about the vehicle, such as auxiliary data, video streams, images, temperatures, pressures, and the like. Vehicle health information may include information about overall vehicle performance, or the performance of various components of the vehicle. Route information may include vehicle location and vector information, vibrational information, route obstructions, wayside information, crossing information, positive vehicle (train) control information, and the like. User messages may include audio calls, SMS messages, internet access, video streaming, and the like. The messages may be prioritized relative to the content type. Vital information (e.g., safety-related) may be prioritized relatively higher than other types of information in one embodiment.

The controller may prioritize at least one of the types of the data streams over at least one other of the types of data streams. For example, the controller may prioritize the operational data stream over the user data stream. The controller may prioritize a data steam by sending the data stream first in time, by sending the data stream with a stronger signal, by delaying less priority streams, by sending a priority stream on a separate channel, or the like. In one embodiment, a time sensitive network (TSN) is established to facilitate prioritization.

As noted above, a vehicle system or vehicle consist is a group of two or more vehicles that are mechanically or logically coupled to travel together in coordination. The vehicles in a vehicle consist can be propulsion-generating units (e.g., vehicles capable of generating propulsive force, which are referred to as propulsion-generating units, powered units, or powered vehicles) that may be in succession and connected together so as to provide motoring and/or braking capability for the vehicle consist. The propulsion-generating units may be connected together with no other vehicles or cars between the propulsion-generating units. One example of a vehicle consist is a locomotive consist that may include locomotives as the propulsion-generating units. Other vehicles may be used instead of or in addition to locomotives to form the vehicle consist. A group of on-road vehicles may form a platoon, which is the equivalent to the consist. A vehicle consist can include non-propulsion generating units, such as where two or more propulsion-generating units are connected with each other by a non-propulsion-generating unit, such as a railcar or other vehicle that cannot generate propulsive force to propel the vehicle consist. A larger vehicle consist, such as a train, can have sub-consists. Specifically, there can be a lead consist (of propulsion-generating units), and one or more remote consists (of propulsion-generating units), such as midway in a line of cars and/or at the end of the train.

In cases where the vehicle system may include multiple powered vehicles, the vehicle system may coordinate operations of the powered vehicles to move the vehicle system. For example, a rail vehicle system may include a powered unit consist that has one or more powered units coupled to one or more non-powered rail cars. Vehicles in a consist may include a designated lead powered unit and one or more remote powered units and/or trail powered units. (The lead powered unit may be at the front, or may be located elsewhere but designated as the lead from a control perspective. Remote powered units are those that are spaced apart from the lead powered unit by one or more non-powered vehicles. Trail powered units are those that are in the same powered unit consist as the lead powered unit, and thereby not spaced apart from the lead powered unit by one or more non-powered rail vehicles, but that are subordinate to control by the lead powered unit.) The lead vehicle may control operation of one or more remote vehicles. More specifically, the lead vehicle (e.g., a lead locomotive) may coordinate tractive and braking operations of the different powered units (e.g., remote or trail locomotives) to control movement of the rail vehicle consist (e.g., a train). In some cases, a single train may include a plurality of such locomotive consists. The locomotive consists may communicate with one another to coordinate tractive and braking operations of the train.

The vehicle consist may have a first or lead propulsion-generating unit and a second (trail or remote) propulsion-generating unit. The terms "lead," "trail," and "remote" indicate which of the propulsion-generating units control operations of other propulsion-generating units rather than referencing a direction of travel. Other terminology has been employed to indicate the relationship master/slave, mother/mate, and the like. It helps indicate which propulsion-generating units are controlled by other propulsion-generating units, regardless of locations within the vehicle consist. For example, a lead propulsion-generating unit can control the operations of the trail or remote propulsion-generating units, even though the lead propulsion-generating unit may or may not be disposed at a front or leading end of the vehicle consist along a direction of travel. The designation of "lead" can be dynamically assigned, and reassigned. A vehicle consist can be equipped for distributed power operation, in which throttle and braking commands are relayed from the lead propulsion-generating unit to the remote propulsion-generating units. The communication may be by a radio link, optical connection, or physical cable. Toward this end, the term vehicle consist should be not be considered a limiting factor when discussing multiple propulsion-generating units within the same vehicle consist.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The various components and modules described herein may be implemented as part of one or more computers, computing systems, or processors. The computer, computing system, or processor may include a microprocessor. The microprocessor may be connected to a communication bus. The computer or processor may include a memory. The memory may include random access memory (RAM) and read only memory (ROM). The computer or processor further may include a storage system or device, which may be a hard disk drive or a removable storage drive such as a floppy or other removable disk drive, optical disk drive, and the like. The storage system may be other similar means for loading computer programs or other instructions into the computer or processor. The instructions may be stored on a tangible and/or non-transitory computer readable storage medium coupled to one or more servers. As used herein, the terms "software" and "firmware" are interchangeable and include a computer program stored in memory for execution by a computer, including RAM memory, ROM memory, EPROM memory, EEPROM memory, and non-volatile RAM (NVRAM) memory.

As used herein, the term "computer" or "computing system" or "controller" may include a processor-based or microprocessor-based system, this may include systems using microcontrollers, reduced instruction set computers (RISC), application specific integrated circuits (ASICs), logic circuits, and other circuit or processor capable of executing the functions described herein. The above examples are exemplary only and do not limit the definition and/or meaning of the term "computer" or "computing system" or "controller." The set of instructions may include various commands that instruct the computer or processor as a processing machine to perform specific operations such as the methods and processes described herein. The set of instructions may be in the form of a software program. The software may be in selected forms, such as system software or application software. Further, the software may be in the form of a collection of separate programs, a program module within a larger program or a portion of a program module. The software may include modular programming in the form of object-oriented programming. The processing of input data by the processing machine may be in response to user commands, or in response to results of previous processing, or in response to a request made by another processing machine.

In accordance with one example or aspect, a system may include a first mobile server unit that may be operably deployed onboard a first vehicle of a vehicle system. The first mobile server unit may include at least one antenna, at least one transceiver that may transmit and receive signals over the at least one antenna, and at least one controller. The controller may control the at least one transceiver to establish a wireless onboard private network in communication with at least a second mobile client unit that is located on a second vehicle of the vehicle system for wireless communication of the signals between the first vehicle and the second vehicle at least while the vehicle system is moving.

The at least one controller may connect at least one handheld device to a public cellular network via at least one of the first mobile server unit or the second mobile client unit. The at least one controller may disconnect all but one of the first mobile server unit and the second mobile client unit from a public cellular network. The at least one controller may convert a first cellular format of a signal received by the first mobile server unit to another, different format prior to transmission to the wireless onboard private network. The at least one controller may identify types of data streams in signals received by the first mobile server unit via the wireless onboard private network. The at least one controller may prioritize at least one of the types of the data streams over at least one other of the types of the data streams. The at least one controller may enhance signal strength of a received signal before transmitting the signal via the wireless onboard private network. The wireless onboard private network may have two or more communication channels and the at least one controller may switch between the two or more communication channels in response to signal strength falling below a determined threshold value. The system may include signal boosters positioned outside of the vehicle system. The signal boosters may enhance the wireless onboard private network.

In accordance with one example or aspect, a system may include a first mobile server unit configured to be operably deployed onboard a first vehicle. The first mobile server unit comprising at least one antenna, at least one transceiver configured to transmit and receive signals over the at least one antenna, and at least one controller. The controller may control the at least one transceiver to establish a wireless onboard private network in communication with at least a second mobile client unit that is located on a second vehicle for wireless communication of the signals between the first vehicle and the second vehicle while at least one of the first vehicle and the second vehicle are moving and connect at least one handheld device to a public cellular network via at least one of the first mobile server unit or the second mobile client unit.

The controller may disconnect all but one of the first mobile server unit and the second mobile client unit from a public cellular network. The at least one controller may convert a first cellular format of a signal received by the first mobile server unit to another, different format prior to transmission to the wireless onboard private network. The controller may enhance signal strength of a received signal before transmitting the signal via the wireless onboard private network. The wireless onboard cellular network has two or more communication channels and the at least one controller may switch between the two or more communication channels in response to signal strength falling below a determined threshold value.

In accordance with one example or aspect, a method is provided that may include operably positioning a first mobile server unit onboard a first vehicle of a vehicle system, the first mobile server unit including at least one antenna, at least one transceiver configured for transmitting and receiving signals over the at least one antenna, and at least one controller. Controlling the at least one transceiver to establish a wireless onboard private network in communication with at least a second mobile client unit that is located on a second vehicle of the vehicle system for wireless communication of the signals between the first vehicle and the second vehicle at least while the vehicle system is moving. The method may include connecting at least one handheld device to a public cellular network via at least one of the first mobile server unit or the second mobile client unit.

The method may include disconnecting all but one of the first mobile server unit and the second mobile client unit from a public cellular network. The method may include converting a first cellular format of a signal received by the first mobile server unit to another, different format prior to transmission to the wireless onboard private network. The method may include identifying types of data streams in the signal received by the first mobile server unit via the wireless onboard private network. The wireless onboard private network has two or more communication channels and the at least one controller may switch between the two or more communication channels in response to signal strength falling below a determined threshold value. In one embodiment, the controller can identify and prioritize control and command signals over other types of signals.

The above description is illustrative and not restrictive. For example, the above-described embodiments (and/or aspects thereof) may be used in combination with each other. In addition, many modifications may be made to adapt a particular situation or material to the teachings without departing from its scope. While the dimensions and types of materials described herein are intended to define the parameters, they are by no means limiting and are exemplary embodiments. Many other embodiments will be apparent to one of ordinary skill in the art upon reviewing the above description. As used herein, the terms "including," "may include", "includes," "has" and "in which" are used as the plain-English equivalents of the respective terms "comprising," "comprises," and "wherein." Moreover, the terms "first," "second," and "third," etc. are used merely as labels, and are not intended to impose numerical requirements on their objects. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that incorporate the recited features. Moreover, unless explicitly stated to the contrary, embodiments "comprising," "including," or "having" an element or a plurality of elements having a particular property may include additional such elements not having that property.

This written description uses examples to disclose several embodiments, and to enable a person skilled in the art to practice the embodiments, including making and using any devices or systems and performing any incorporated methods. The patentable scope may include other examples that occur to one of ordinary skill in the art. Such other examples are intended to be within the scope of the invention if they have structural elements that do not differ from the literal language herein, or if they include equivalent structural elements with insubstantial differences from the literal languages used herein.

What is claimed is:

1. A system comprising:
    a first mobile server unit disposed on a first vehicle of a vehicle system; and
    a controller comprising one or more processors that is configured to establish a wireless onboard private network in communication with at least a second mobile client unit that is located on a second vehicle of the vehicle system for wireless communication of the signal between the first vehicle and the second vehicle,
    wherein the at least one controller is further configured to identify types of data streams in the signal received by the first mobile server unit via the wireless onboard private network, and
    wherein the at least one controller is further configured to prioritize at least one of the types of the data streams over at least one other of the types of the data streams.

2. The system of claim 1, wherein the at least one controller is further configured to selectively access or disconnect all but one of the first mobile server unit and the second mobile client unit from a public cellular network.

3. The system of claim 1, wherein the controller is further configured to connect at least one handheld or wearable device through the private cellular network to a public cellular network via one or both of the first mobile server unit and the second mobile client unit.

4. The system of claim 1, wherein the at least one controller is further configured to convert a first format of the signal received by the first mobile server unit to another, different format prior to transmission to the wireless onboard private network.

5. The system of claim 1, further comprising one or more signal boosters positioned outside of the vehicle system, the signal boosters being configured to one or both of:
enhance the wireless onboard private network; and
link the onboard private network to a public network.

6. The system of claim 1, wherein the at least one controller is further configured to enhance signal strength of a received signal before transmitting the signal via the wireless onboard private network.

7. The system of claim 1, wherein the wireless onboard private network has two or more communication channels and the at least one controller is further configured to switch between the two or more communication channels in response to signal strength falling below a determined threshold value.

8. A system comprising:
a first mobile server unit disposed on a first vehicle of a vehicle system; and
a controller comprising one or more processors that is configured to establish a wireless onboard private network in communication with at least a second mobile client unit that is located on a second vehicle of the vehicle system for wireless communication of the signal between the first vehicle and the second vehicle,
wherein the at least one controller is further configured to enhance signal strength of a received signal before transmitting the signal via the wireless onboard private network.

9. The system of claim 8, wherein the at least one controller is further configured to identify types of data streams in the signal received by the first mobile server unit via the wireless onboard private network.

10. The system of claim 8, wherein the at least one controller is further configured to selectively access or disconnect all but one of the first mobile server unit and the second mobile client unit from a public cellular network.

11. The system of claim 8, wherein the controller is further configured to connect at least one handheld or wearable device through the private cellular network to a public cellular network via one or both of the first mobile server unit and the second mobile client unit.

12. The system of claim 8, wherein the at least one controller is further configured to convert a first format of the signal received by the first mobile server unit to another, different format prior to transmission to the wireless onboard private network.

13. The system of claim 8, wherein the at least one controller is further configured to prioritize at least one of the types of the data streams over at least one other of the types of the data streams.

14. The system of claim 8, wherein the wireless onboard private network has two or more communication channels and the at least one controller is further configured to switch between the two or more communication channels in response to signal strength falling below a determined threshold value.

15. The system of claim 8, further comprising one or more signal boosters positioned outside of the vehicle system, the signal boosters being configured to one or both of:
enhance the wireless onboard private network; and
link the onboard private network to a public network.

16. A system comprising:
a first mobile server unit disposed on a first vehicle of a vehicle system; and
a controller comprising one or more processors that is configured to establish a wireless onboard private network in communication with at least a second mobile client unit that is located on a second vehicle of the vehicle system for wireless communication of the signal between the first vehicle and the second vehicle,
wherein the wireless onboard private network has two or more communication channels and the at least one controller is further configured to switch between the two or more communication channels in response to signal strength falling below a determined threshold value.

17. The system of claim 16, wherein the at least one controller is further configured to selectively access or disconnect all but one of the first mobile server unit and the second mobile client unit from a public cellular network.

18. The system of claim 16, wherein the controller is further configured to connect at least one handheld or wearable device through the private cellular network to a public cellular network via one or both of the first mobile server unit and the second mobile client unit.

19. The system of claim 16, wherein the at least one controller is further configured to convert a first format of the signal received by the first mobile server unit to another, different format prior to transmission to the wireless onboard private network.

20. The system of claim 16, wherein the at least one controller is further configured to identify types of data streams in the signal received by the first mobile server unit via the wireless onboard private network.

* * * * *